United States Patent Office 3,282,593
Patented Nov. 1, 1966

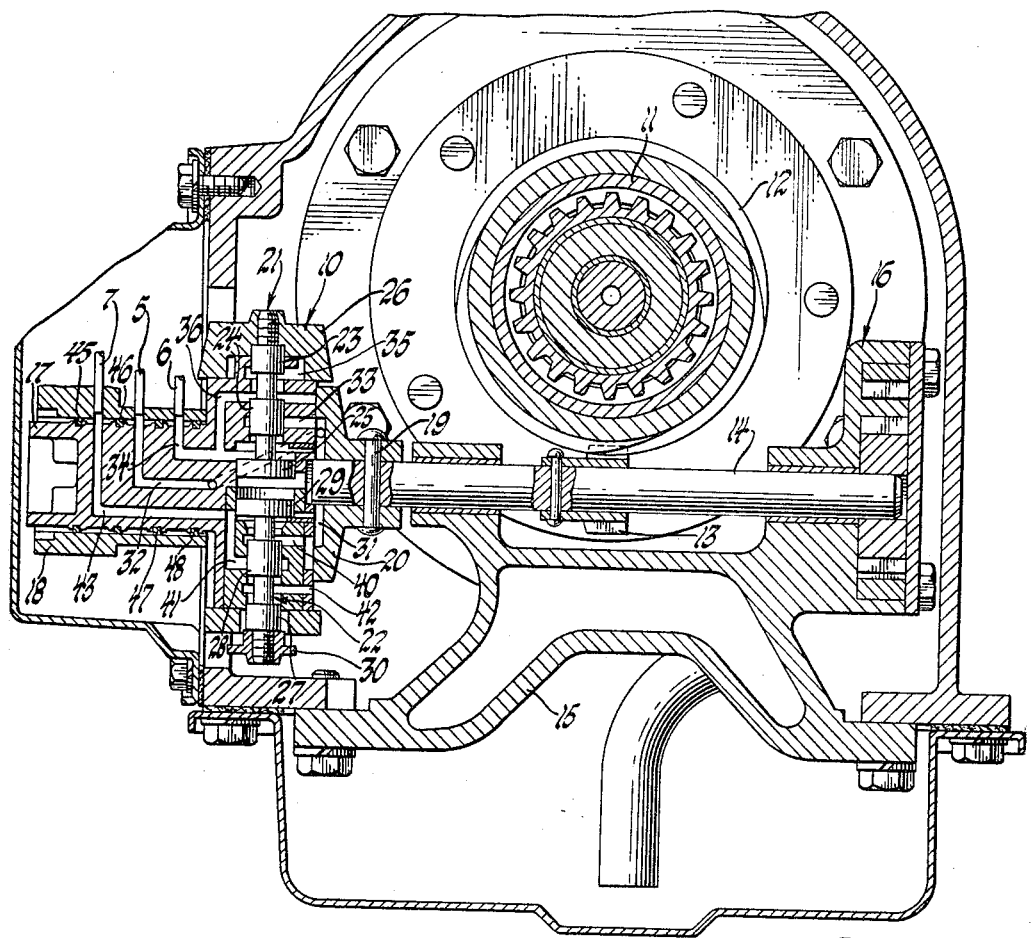

3,282,593
ROTATING GOVERNOR SEAL RING
Kenneth E. Snyder, Northville, Mich., assignor to General Motors Corporation, Detroit, Mich., a corporation of Delaware
Filed Oct. 28, 1963, Ser. No. 319,259
5 Claims. (Cl. 277—12)

This invention relates to oil seal rings and more particularly to an improved oil seal ring for use in a hydraulic governor of the type commonly employed in conjunction with control systems for automatic vehicle transmissions.

In hydraulic governors for automatic vehicle transmissions it has been common practice to employ a rotating governor body supported for rotation in a fixed cylinder or support housing and to use oil seal rings adjacent the oil supply ports and governor pressure delivery ports to prevent undesirable leakage of fluid at these ports. In such assemblies, reduced useful life has been experienced due to wear of the lands on the rotating bodies by the oil seal rings. This has presented a serious problem requiring expensive governor replacement due to the limited useful life of governors.

The present invention constitutes an improvement providing governor bodies having long useful life and freedom from service attention.

An object of this invention is to provide a governor having an improved oil seal ring and rotating body assembly wherein wear between the oil seal ring and the oil seal ring lands on the rotating body is minimized.

Another object of this invention is to provide a rotatable governor having an improved oil seal ring and rotating body assembly wherein the oil seal ring is physically connected to the rotating body for rotaion therewith.

A further object of this invention is to provide an improved governor having an oil seal ring and rotating body assembly wherein the rotating body is at times rotated in one direction and at other times rotated in the opposite direction and wherein the oil seal ring is physically connected to a land of the rotating body for rotation therewith irrespective of the direction of rotation of the rotating body.

A more particular object of this invention is to provide a rotatable governor having an improved expandable oil seal ring and rotating body assembly wherein the oil seal ring is disposed between spaced lands on the rotating body and is secured to one land of the rotating body for rotation therewith and wherein normal expansion of the ring is maintained.

An additional object of this invention is to provide a rotatable governor having an improved oil seal ring and rotating body assembly wherein an oil seal ring is disposed between spaced lands of a rotating body, wherein one land of the rotating body is provided with a recess and wherein the oil seal ring has formed thereon an offset tongue extending into the recess for rotating the oil seal ring upon rotation of the rotatable governor body to prevent wear of the lands by the oil seal ring.

A further object of this invention is to provide a rotatable governor having an improved oil seal ring and land arrangement wherein a pair of offset tangs formed on the oil seal ring at the ring gap extend into a recess in one land so as to always pull the ring in the direction of rotation of the governor body irrespective of the direction of rotation of the body to eliminate self-energization tendencies and to prevent cylinder wall scoring as might result from pushing the end of the ring gap into the bore.

These and other objects and advantages of this invention will be apparent from the following description and claims, taken in conjunction with the accompanying drawings, in which:

FIGURE 1 is a sectional view through a governor constructed in accordance with the principles of this invention.

FIGURE 2 is an enlarged view of one oil seal ring and governor body illustrating the relationship of the seal ring to the governor body.

FIGURE 3 is a sectional view taken along the line 3—3 of FIGURE 2.

Referring to FIGURE 1, there is shown a hydraulic governor of the type shown in FIGURE 12 of the patent to Walter B. Herndon, 2,790,327, issued April 30, 1957. A governor assembly indicated generally at 10 is driven by a vehicle transmission power delivery shaft 11 by means of gears 12 and 13 and a governor drive shaft 14. Shaft 14, rotatably supported in a housing 15, drives governor 10 and may also drive a pump 16. Pump 16 may be omitted from the assembly and is not essential to the disclosure of this particular improvement. A rotatable governor body 17, supported for rotation in a fixed nonrotatable cylinder housing 18, is driven by shaft 14, the body 17 being fixed to a drive plate 20 which is pinned to shaft 14 by a pin 19.

Rotatable body 17 carries a pair of centrifugally responsive governor valves 21 and 22 adapted to deliver variable pressure to governor pressure delivery passages 34 and 43. Valve 21, which may be termed a G-1 pressure control valve, controls the governor pressure in passage 34. Valve 22, which may be termed a G-2 control valve, controls the governor pressure delivery to passage 43. Valve 21 includes a pair of lands 23 and 24 of equal diameter and a land 25 of greater diameter. A weight 26 is secured to one end of the valve 21. Valve 22 includes a pair of lands 27 and 28 of equal diameter and a land 29 of greater diameter. A weight 30 of lesser mass than weight 26 is secured to one end of valve 22. A line pressure supply chamber 31 is supplied with pump line pressure from a line pressure supply passage 5 through a passage 32 in rotatable body 17. Line pressure is admitted to land 24 through a port 33 connected to chamber 31. Land 24 controls flow of fluid from port 33 to a delivery passage 34. Land 23 controls exhaust of fluid through an exhaust port 35 hydraulically connected to governor pressure delivery passage 34 through a branch passage 36. Governor pressure in passage 34 acts on large land 25 tending to move the valve 21 inwardly into the body 17 in opposition to centrifugal force tending to move the valve outwardly with respect to the housing.

Line pressure from chamber 31 is conducted to a port 40 of valve 22. Port 40 delivers governor pressure to governor pressure delivery port 41 and port 42 is an exhaust port. A governor pressure delivery passage 43 connected to port 41 delivers a second governor pressure, which may be termed G-2 pressure to large land 29 tending to move valve 22 inwardly into body 17 in opposition to centrifugal force tending to move the valve outwardly with respect to the body.

It will be apparent that the governor pressure delivered by valves 21 and 22 will be different and will increase in response to increase in speed of rotation of body 17. Since body 17 is driven through the transmission power delivery shaft, the direction of rotation of body 17 will be in one direction when operating in forward drive and in the opposite direction when operating in reverse.

An external nonrotatable line pressure supply passage 5 fixed to housing 18 supplies line pressure to passage 32 in rotatable body 17. G-1 pressure delivery passage 34 in body 17 delivers governor pressure to a fixed nonrotatable passage 6 in housing 18. Passage 43 in rotatable body 17 delivers G-2 pressure to a passage 7 in housing 18.

It will be noted that body 17 is provided with four oil seal rings 45, 46, 47 and 48 for preventing oil leakage at the juncture of the rotating passages 32, 34 and 43 and fixed passages 5, 6 and 7, respectively. Each oil seal ring is of similar construction and accordingly only one is illustrated in FIGURES 2 and 3.

Referring to FIGURES 2 and 3, governor body 17 has provided thereon a pair of spaced raised lands 49a and 49 for receiving oil seal ring 45 therebetween. One of the lands 49 is cut away to form a recess 50 therein adapted to receive a pair of offset axially extending tangs 51 and 52 formed on oil seal ring 45 at the adjacent ends of the oil seal ring. It has been found that the use of ordinary seal rings results in rapid wear between the seal ring and lands due to relative rotation of these members. The problem of rapid land wear and consequent replacement requirements in production governors of standard design due to oil leakage arising from rapid wear of the lands of the rotating governor body became a serious and expensive service problem both to the purchaser and manufacturer. It has been found that the modification of the seal ring and land as taught herein results in a governor having long useful life and minimizes governor replacement and servicing costs associated therewith. The arrangement completely eliminates wear between the rotating governor body lands and the oil seal ring. The arrangement is of simple construction, easy to assemble and inexpensive to manufacture. The arrangement, including the two tangs 51 and 52 disposed in recess 50, is of particular advantage in a governor of the type disclosed which is driven at times in a clockwise direction and at other times in a counterclockwise direction. With the double tang arrangement the rotating governor body always pulls the oil seal ring in the direction of rotation, thereby eliminating any self-energization tendencies and reducing cylinder wall scoring due to pushing the end of the ring gap into the bore.

It will further be understood that the slot and tongue arrangement eliminates wear between the ring and the lands on the rotatable body and in no way impedes the normal expansion of the seal ring so that the seal contact of the ring and housing is maintained even though the seal ring is rotated at the speed of rotation of the rotatable body.

I claim:
1. In a governor of the type having a rotatable body disposed in fixed axial relationship with respect to and supported for rotation in a housing and having a fluid passage in said housing and a fluid passage in said rotatable body coacting with said housing passage for transmitting fluid, said rotatable body and said housing being disposed in coaxial relationship and having a common longitudinal axis, means for rotating said rotatable body about said longitudinal axis, said governor also having oil seal rings for preventing loss of fluid at the juncture of said passages, the improvement which comprises means connecting said oil seal rings to said rotatable body for rotating said seal rings in response to rotation of said rotatable body, to thereby prevent wear of said rotatable body due to relative rotation of said body and seal rings.

2. In a governor of the type having a rotatable body disposed in fixed axial relationship with respect to and supported for rotation in a housing and having a fluid passage in said housing coacting with a fluid passage in said rotatable body for transmitting fluid between said housing and body, said rotatable body and housing being disposed in coaxial relationship and having a common longitudinal axis, means for rotating said governor body about said longitudinal axis, said governor also having split expandable oil seal rings disposed between said housing and body for preventing fluid leakage from said passages, the improvement which comprises means connecting said oil seal rings for rotation with said rotatable body, said connecting means including a recess in said rotatable body and an axially extending tongue formed on said seal ring immediately adjacent said seal ring split and extending into said recess, said connecting means permitting said oil seal rings to expand into contact with said housing to assure physical contact of said rings with said housing and rotating said seal rings in response to rotation of said body to prevent wear of said body by said seal rings.

3. In a governor of the type having a rotatable body supported for rotation in a housing and having coacting passages between said housing and rotatable body for transmitting fluid, an annular recess in said rotatable body, an expandable split ring seal disposed in said recess for contacting said housing, a slot in one side wall of said annular recess, and an axially extending tongue formed on said ring immediately adjacent said ring split and extending into said slot, said slot and tongue coacting to permit normal expansion of said expandable ring and to rotate said ring in response to rotation of said rotatable member to thereby prevent wear of said rotatable body due to relative rotation of said body and ring seal.

4. In a governor of the type having a rotatable body supported for rotation in a housing, interconnecting passages in said housing and body for transmitting fluid between said housing and body, spaced lands on said rotatable body forming a groove adapted to receive a seal ring, a slot in one of said lands, an expandable split seal ring disposed in a groove for preventing leakage of fluid from said passages, and a pair of spaced tongues carried by said seal ring extending into said slot for rotating said seal ring in response to rotation of said rotatable body to prevent wear of said land due to relative rotation of said land and said seal ring each of said tongues being disposed on said seal ring immediately adjacent said seal ring split, one of said tongues being effective to rotate said seal ring upon rotation of said governor body in a first direction of rotation and the other of said tongues being effective to rotate said seal ring upon rotation of said governor body in a second direction of rotation.

5. In a governor of the type having a housing and a rotatable body supported in said housing, said body being rotated at times in one direction with respect to said housing and at other times in the opposite direction of rotation with respect to said housing, coacting passages in said housing and body for transmitting fluid, a pair of axially spaced lands on said rotatable body forming an annular groove therebetween, a slot in one of said lands, a split expandable seal ring disposed in said slot for preventing leakage of fluid from said passages, first and second tongues on said seal ring extending axially from said ring into said slot, said tongues being formed on said seal ring at opposite sides of and immediately adjacent to said seal ring split, one of said tongues being effective to contact one side wall of said slot upon rotation of said rotatable body in one direction and the other tongue contacting another side wall of said slot upon rotation of said rotatable body in the opposite direction to prevent wear of said lands by said ring.

References Cited by the Examiner
UNITED STATES PATENTS 2,790,327  4/1957  Herndon _____ 74—472
3,032,049  5/1962  Schulz _____ 137—56

FOREIGN PATENTS 441,224  1/1936  Great Britain.

SAMUEL ROTHBERG, *Primary Examiner.*